United States Patent [19]
Baader et al.

[11] Patent Number: 5,237,494
[45] Date of Patent: Aug. 17, 1993

[54] FREQUENCY INVERTING APPARATUS

[75] Inventors: Uwe Baader, Wuppertal; Gerhard Martens, Remscheid; Karl-Ludwig Rafflenbeul, Ennepetal, all of Fed. Rep. of Germany

[73] Assignee: Barmag AG, Remscheid, Fed. Rep. of Germany

[21] Appl. No.: 757,255

[22] Filed: Sep. 10, 1991

[30] Foreign Application Priority Data

Sep. 10, 1990 [DE] Fed. Rep. of Germany ....... 4028684

[51] Int. Cl.$^5$ .................. H05K 7/20; H02M 5/42; H02P 7/74
[52] U.S. Cl. .................................. 363/141; 363/37; 363/67; 363/71; 361/709
[58] Field of Search ............... 318/34, 39, 41, 49, 318/51, 53, 66, 722, 723, 800, 801, 803, 807; 363/34, 37, 55, 67, 69, 71, 123–129, 141; 361/381, 386, 388

[56] References Cited

U.S. PATENT DOCUMENTS

| | | |
|---|---|---|
| 3,742,327 | 6/1973 | Nettles ........................ 318/678 |
| 3,746,967 | 7/1973 | Koltuniak et al. ............... 321/5 |
| 4,125,800 | 11/1978 | Jones ........................ 318/681 |
| 4,161,016 | 7/1979 | Born et al. ................... 361/388 |
| 4,263,535 | 4/1981 | Jones ......................... 318/87 |
| 4,458,305 | 7/1984 | Buckle et al. ................. 363/141 |
| 4,471,855 | 9/1984 | Nomura ..................... 318/803 X |
| 4,503,369 | 3/1985 | Nishijima et al. ............. 318/254 |
| 4,555,753 | 11/1985 | Takahashi ................... 363/126 |
| 4,622,629 | 11/1986 | Glennon ...................... 363/70 |
| 4,772,999 | 9/1988 | Fiorina et al. ............... 363/141 |
| 4,872,102 | 10/1989 | Getter ........................ 363/141 |
| 4,967,333 | 10/1990 | Callier et al. ................ 363/17 |
| 4,988,273 | 1/1991 | Faig et al. ................. 318/254 X |
| 5,038,194 | 8/1991 | Takahama ..................... 357/68 |
| 5,111,280 | 5/1992 | Iversen ....................... 357/82 |

OTHER PUBLICATIONS

"Beltro-Vert" brochure, *Barmag Electronic*, 4 pages.

*Primary Examiner*—Bentsu Ro
*Attorney, Agent, or Firm*—Bell, Seltzer, Park & Gibson

[57] ABSTRACT

An apparatus for driving a plurality of motors at different variable speeds. The apparatus includes a rectifier for supplying direct current power to a dc bus circuit. A plurality of inverters are connected to the dc bus circuit and each inverter drives a respective motor. Each inverter is controlled by an individual controller connected thereto for controlling the frequency of the output of the inverter to thereby control the speed of the associated motor. The inverters are preferably mounted on a common heat sink to reduce electrical and mechanical complexity. The apparatus permits the rectifier and the dc bus circuit to be sized to handle a maximum rating of less than the sum total of maximum loads of each of the motors. The dc bus circuit also serves to distribute energy generated by a slowing motor, for example, to other motors driven from the bus circuit. A chopper resistor may be included and switched across the dc bus circuit to provide braking to the motors.

5 Claims, 1 Drawing Sheet

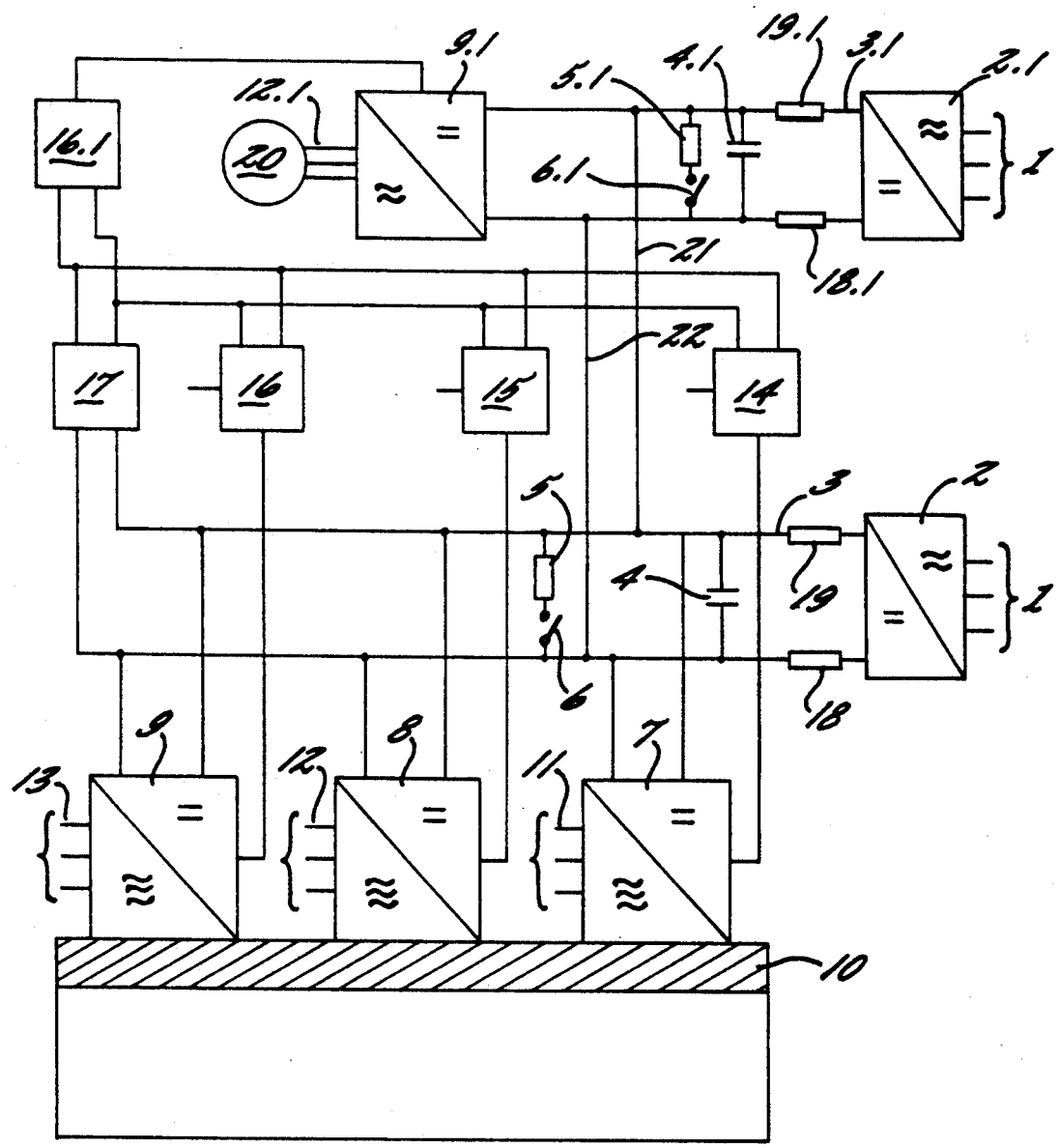

FREQUENCY INVERTING APPARATUS

FIELD OF THE INVENTION

The present invention relates to the field of electrical power frequency inverters and, more particularly, to a frequency inverting apparatus for driving a plurality of motors.

BACKGROUND OF THE INVENTION

A frequency inverter for driving a single motor is known, for example, from applicant's sales brochure "BELTRO-VERT Frequenzumrichter/Frequency Inverter 1.1 kW–2.2 kW."

Because of good controllability, frequency inverters can be used in machines in which several shafts are driven at differently variable rotational speeds. Because of the absence of suitable frequency inverters in the past, it has been common practice to use a single motor in these cases and drive the several shafts from the single motor via adjustable gear mechanisms. The frequency inverter described in applicant's brochure permits one motor and one controllable frequency inverter be coupled to each shaft.

SUMMARY OF THE INVENTION

It is an object of the present invention to reduce the technical complexity for multipleshaft drives.

The above and other objects and advantages according to the invention are achieved in accordance with the present invention by the provision of an inverting apparatus having a rectifier for supplying a direct-current (dc) bus circuit, and a plurality of individually controllable inverters connected to the dc bus circuit, with each of the inverters being adapted for driving a respective motor. Also, a separate controller is connected to each of the inverters for separately controlling the output frequency thereof and thus the rotational speed of the associated motor.

The invention offers an advantage especially frequency inverter and motor is alternately operated at a high and a low power input. In this event, it has been necessary in the past to rate the rectifying power supply and the dc bus circuit and likewise the inverter, for the highest power consumption at each shaft, for example, for the output required at startup. According to the invention, it will be necessary to rate only the respective inverter for the highest occurring power consumption of the respective shaft. The common rectifier power supply and the common dc bus circuit, however, need only be rated for the highest sum of the power which is simultaneously required by the jointly operated shafts. In many cases and as aforesaid, especially in the case of several shafts with an alternately higher and lower power consumption, this sum is smaller than the sum of the maximum power requirement of each shaft.

According to another aspect of the invention, the plurality of inverters may preferably be mounted to a common heat sink. Thus, the invention not only enjoys reduced electrical complexity, but also has considerably less mechanical complexity for heat sinks which are required for the cooling of the power electronics.

Another advantage of the present invention is that it is possible to electrically brake individual shafts. In this process, the braking energy is fed back to the common dc bus circuit and used for the operation of the other shafts. A further advantage of the invention is that in the event of a power failure or power cutoff, an automatic and synchronous decrease of the rotational speeds of all shafts is provided while maintaining the adjusted speed ratio. The reason therefor is that the shafts with the greater moment of inertia exercise a generator effect with their drive motors, thereby providing the energy to the common dc bus for the shafts and drive motors with the lesser moment of inertia.

Another aspect of the invention allows interconnection of several groups of shafts in a similar fashion, with each group and their motors and inverters being energized respectively by a common dc bus circuit. Moreover, for a very strong electric braking, it is possible to short each dc bus circuit by a chopper resistor which can be connected or disconnected by a switch.

It is also possible to use the common dc bus circuit for the energy supply of further devices, such as the frequency controllers for each inverter.

BRIEF DESCRIPTION OF THE DRAWING

The sole FIGURE illustrates a schematic circuit diagram of the frequency inverting apparatus according to the invention.

DETAILED DESCRIPTION OF THE PREFERRED EMBODIMENTS

The invention will be described below with reference to the accompanying drawing in which a preferred embodiment of the invention is shown. Connected to the three phases of a power supply system 1 is a rectifier 2. The rectifier 2 supplies, via diodes, a dc bus circuit 3. A capacitor 4 serves to smooth the current. Connected to the dc bus circuit 3 are three inverters 7, 8, 9 with their two inputs. In these inverters, the dc voltage is converted to a three phase ac voltage. The frequency of each of the inverters 7, 8, 9, can be controlled by a controller 14, 15, 16. Depending on the rating of the controller, it is also possible to adjust further parameters of the output voltage On the three-phase outputs 11, 12, 13 of the inverters 7, 8, 9, such as, for example, the wave shape of the ac voltage, amplitude, pulse duration, and others. To this end, each of the controllers 14, 15, 16 is supplied with a low voltage (24 volts) direct current by a voltage regulator 17 connected to the dc bus circuit 3. The voltage regulator 17 supplies a constant and lower voltage of, for example, 24 volts, which is suitable for the control functions. The dc bus circuit 3 can be shorted by a chopper resistor 5 and a switch 6 for braking.

Connected in parallel to the above-described frequency inverter is a further frequency inverter which comprises a rectifier 2.1, a dc bus circuit 3.1, a capacitor 4.1, a chopper resistor 5.1, a switch 6.1, an inverter 9.1, and an output 12.1. As shown in the illustrated embodiment this frequency inverter operates a motor 20. Rectified phases of the dc bus circuits 3 and 3.1 of the two parallel connected frequency inverters are interconnected by buffer lines 21 and 22.

The inverters 7, 8, 9 which are connected to the common dc bus circuit 3, are mounted on a common heat sink 10. The corresponding heat sink for the inverter 9.1 of the other frequency inverter is not shown.

The inverters 7, 8, 9 with their outputs 11, 12, 13 each operate one motor, for example, (not shown). Since the motors are never operated with their maximum output at the same time, it is possible to rate the rectifier 2 and the dc bus circuit 3 for a lower output. The same applies for the common heat sink 10. Rather, a rating to the maximum sum of the power respectively consumed at the same time will suffice. In particular, when the inverters 7 and 8 operate respective drive motors of two take-up spindles which are simultaneously in operation only for a short time while packages are doffed, the sum of the outputs will not be decisive for the rating, but a power value which ranges between the maximum individual output and the sum of the maximum individual outputs determines the rating.

When one of the motors is shut down, it will feed back in the fashion of a generator to the dc bus circuit 3. As a result, the output required from the power supply system is decreased. The chokes 18, 19 which are interconnected in the dc bus circuit 3 between the rectifier and the capacitor, serve the purpose of making the voltage uniform. Otherwise, an overload of the rectifiers would result.

A similar arrangement also applies to the motor 20 which is energized via the separate frequency inverter 9.1, whose dc bus circuit, however, is connected directly to the other dc bus circuit 3 by buffer lines 21, 22. Also here, the chokes 18.1 and 19.1 are necessary to avoid an overload of the rectifier 2.1. On the other hand, it is possible to control the inverters 7, 8, 9, or respectively 9.1, by means of the controllers 14, 15, 16, Or respectively 16.1, in accordance with the moment of inertia of the shaft which is driven by the respective motor, so that in the event of a failure of the supply voltage switches 6 and 6.1 respectively are operated and the chopper becomes effective only after a certain time after the voltage failure. This time is selected such that the voltage of the dc bus circuits does not drop during this period of time. As a result, the normal operation is maintained during a certain period of time of the power failure, for example 500 milliseconds. This is of great advantage for poorly rated power supply systems and for machines which must be shut down during a power failure for reasons of safety.

In the drawings and specification, there has been set forth a preferred embodiment of the invention, and although specific terms are employed, they are used in a generic and descriptive sense only and not for purposes of limitation.

That which is claimed is:

1. A frequency inverting apparatus for driving a plurality of motors at variable rotational speeds, the plurality of motors having non-consecutive alternately high and low power consumption requirements, said apparatus comprising:

a rectifier for converting ac power to dc power;
a dc bus circuit connected to said rectifier;
said rectifier and said dc bus circuit having a predetermined power output rating;
a plurality of inverters connected to said dc bus circuit, each of said inverters having a respective predetermined high power input rating being adapted for driving a respective motor at a corresponding high power consumption requirement;
said predetermined power output rating of said rectifier and said dc bus circuit being less than a sum of the respective predetermined high power input ratings of said plurality of inverters, and said predetermined power output rating being at least as great as a sum corresponding to a maximum power consumed at a same time by said inverters to thereby account for the non-consecutive alternately high and low power consumption requirements of said plurality of motors;
a separate controller connected to each of said inverters for separately controlling the output frequency thereof to thereby control the rotational speed of the associated motor; and
a heat sink, with each of said inverters being mounted on said heat sink, said heat sink having a predetermined rating less than a sum of corresponding high of said plurality of inverters based on the respective high power input ratings of each of said inverters, and said predetermined rating being at least as great as a sum corresponding to a maximum power consumed at a same time by said inverters to thereby account for the non-consecutive alternately high and low power consumption requirement of said plurality of motors.

2. The apparatus according to claim 1 further comprising one or more additional rectifiers connected in parallel to said dc bus circuit, and further comprising a choke being interposed in each of the output lines from respective rectifiers to the dc bus circuit.

3. The apparatus according to claim 1 further comprising a chopper resistor and a switch connected across said dc bus circuit for shorting the dc bus circuit across the chopper resistor.

4. The apparatus according to claim 1 further comprising a voltage regulator connected to said dc bus circuit of supplying one or more of said controllers with dc current.

5. The apparatus according to claim 1 further comprising a second frequency inverter comprising a rectifier, a second dc bus circuit, and at least one inverter and an associated controller; and wherein said second dc bus circuit is connected to the first-mentioned dc bus circuit.

* * * * *

UNITED STATES PATENT AND TRADEMARK OFFICE
CERTIFICATE OF CORRECTION

PATENT NO. : 5,237,494
DATED : August 17, 1993
INVENTOR(S) : Baader, et al.

It is certified that error appears in the above-identified patent and that said Letters Patent is hereby corrected as shown below:

Column 1, line 27, after "to" insert -- further --.

Column 1, line 28, "multipleshaft" should be -- multiple-shaft --.

Column 1, line 41, after "especially" insert -- when each of the shafts driven by a respective --.

Column 2, line 40, "On" should be -- on --.

Column 3, line 27, "Or" should be -- or --.

Column 4, line 24, "high" should be -- ratings --.

Column 4, lines 31-32, "requirement" should be -- requirements --.

Column 4, line 44, "of" (first occurrence) should be -- for --.

Signed and Sealed this

Twenty-ninth Day of March, 1994

Attest:

BRUCE LEHMAN

*Attesting Officer*  *Commissioner of Patents and Trademarks*